US 8,346,975 B2

(12) United States Patent
Cardona et al.

(10) Patent No.: US 8,346,975 B2
(45) Date of Patent: Jan. 1, 2013

(54) SERIALIZED ACCESS TO AN I/O ADAPTER THROUGH ATOMIC OPERATION

(75) Inventors: Omar Cardona, Cedar Park, TX (US); James B. Cunningham, Austin, TX (US); Baltazar De Leon, III, Austin, TX (US); Matthew R. Ochs, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 931 days.

(21) Appl. No.: 12/414,528

(22) Filed: Mar. 30, 2009

(65) Prior Publication Data

US 2010/0251268 A1    Sep. 30, 2010

(51) Int. Cl.
G06F 15/16    (2006.01)
G06F 3/00    (2006.01)
H04L 12/28    (2006.01)

(52) U.S. Cl. ............ 709/250; 370/394; 710/54

(58) Field of Classification Search ........... 709/250; 370/394; 710/54
See application file for complete search history.

(56) References Cited

U.S. PATENT DOCUMENTS

| | | | |
|---|---|---|---|
| 6,222,822 B1 * | 4/2001 | Gerardin et al. | 370/230 |
| 6,988,180 B2 | 1/2006 | Kadatch | |
| 7,020,713 B1 | 3/2006 | Shah et al. | |
| 7,386,619 B1 | 6/2008 | Jacobson et al. | |
| 2004/0218592 A1 * | 11/2004 | Nagar et al. | 370/381 |
| 2006/0095606 A1 * | 5/2006 | Emmes et al. | 710/46 |
| 2007/0168592 A1 | 7/2007 | Todoroki et al. | |
| 2008/0040519 A1 * | 2/2008 | Starr et al. | 710/39 |
| 2009/0252167 A1 * | 10/2009 | Naven | 370/394 |

FOREIGN PATENT DOCUMENTS

WO    2007138250 A3    12/2007

OTHER PUBLICATIONS

Author: Theodore Johnson; Title: A Prioritized Multiprocessor Spin Lock; Item: Article; Date: Sep. 1997; pp. 8; Issue: 1045-9219/97; Publisher: IEEEE; Source: Transactions on Parallel and Distributed Systems vol. 8 No. 9 Source: IEEE Xplore.

(Continued)

*Primary Examiner* — Jeong S Park
(74) *Attorney, Agent, or Firm* — Libby Toub; Robert C. Rolnik

(57) ABSTRACT

Disclosed is a computer implemented method, computer program product, and apparatus to enqueue one or more packets in a device driver for an I/O adapter. A device driver receives, by a processor executing the device driver, a reference to a list of transmit packets. The device driver may then atomically fetch and set a transmit active flag, wherein atomically setting comprises determining a former status of the transmit active flag. Responsive to a determination that a former status of the transmit active flag is different than a current status of the transmit active flag, the device driver atomically removes, by a processor executing the device driver, any packets referenced by a host machine transmit queue reference. The device driver pre-pends transmit packets referenced by the host machine transmit queue reference to the list of transmit packets to form an augmented list of transmit packets. The device driver builds a work request based on the augmented list of transmit packets. The device driver notifies the I/O adapter of the work request. The device driver atomically resets the transmit active flag.

25 Claims, 4 Drawing Sheets

OTHER PUBLICATIONS

Author: Kenneth W. Dritz et al.; Title: Beyond "Speedup": Performance Analysis of Parallel Programs; Item: Abstract; Date: Feb. 1987; pp. 36; Issue: DE87-007954, ANL-87-7; Publisher: Argonne National Laboratory, Argonne, IL, USA.

Author: Mats Bjorkman; Title: Architectures for High Performance Communication; Item: Dissertation; Date: Sep. 1993; pp. 125; Issue: ISSN 1101-1335 SICS Dissertation Series 10; Publisher: Department of Computer Systems, Uppsala, SE.

Author: Anupam Keshav Bhide; Title: An Analysis of Architectures for High Performance Transaction Processing; Item: Dissertation; Date: Sep. 1988; pp. 183; Issue: vol. 5009B; Publisher: Dissertations Abstracts International; Source: University of California, Berkeley.

Dritz; Beyond Speedup: Performance Analysis of Parallel Programs; Aerospace and High Technology Database; IP Accession No. N87-24115; Report No. DE87-007954; 1987.

Bjorkman; Architetures for High Performance Communication; vol. 5503C of Dissertations Abstracts International; 1993; Department of Computer Systems, Uppsala, Sweden.

Bhide; An Analysis of Architectures for High-Performance Transaction Processing; vol. 5009B of Dissertations Abstracts International; p. 4086 183pgs1988; Univ. Calif. Berkeley.

Johnson; Prioritized Multiprocessor Spin Lock; IEEE Transactions on Parallel and Distributed Systems; 1997; AT&T Labs, Florham Park NJ; Pascal No. 97-0507912.

Author: Paul S. Barth; Title: Using Atomic Data Structures for Parallel Simultation; Item: Article; Date: Apr. 1992; pp. 8; Issue: 0-8186-2775-1/92; Publisher: IEEE: Source: Proceedings of the Scalable High Performance Computing Conference, 1992 SHPCC-92.

Author: IBM TDB: Title: Eliminating a Bottleneck in Resource Allocation for Multiprocessor Systems; Item: Article; Date: Oct. 2002: pp. 3; Issue: IPCOM000015820D; Publisher: IP.com; Source: www.IP.com.

Author: John Cieslewicz et al.; Title: Parallel Bufferes for Chip Multiprocessors; Item: Article; Date: Jun. 2007; pp. 10; Issue: ACM 978-1-59593-772-8; Source: Proceedings of the 3rd International Workshop on Data Management on New Hardware, Beijing, China.

Author: D. McCrady; Title: Parallel Programming in Native Code: Avoiding Contention Using Combinable Objects; Item: Article; Date: Sep. 2008; pp. 3; Source: www.blogs.msdn.com.

* cited by examiner

SERIALIZED ACCESS TO AN I/O ADAPTER THROUGH ATOMIC OPERATION

BACKGROUND OF THE INVENTION

1. Field of the Invention

The present invention relates generally to a computer implemented method, data processing system, and computer program product for prioritizing and harmonizing access to a common resource by multiple processors executing instructions. More specifically, the present invention relates to serializing process calls to an I/O adapter.

2. Description of the Related Art

Modern data processing systems use more processors than the generation of data processing systems of a decade ago. IC Integrated circuit miniaturization has made the practice of including multiple cores on a die the norm, rather than the exception. Consequently, a typical data processing system can have multiple processes executing on multiple processors. Nevertheless, for communication purposes, there can be a fewer number of I/O adapters than there are processes in a data processing system. As a result, in conventional data processing systems, arbitration between competing processes is performed to enhance reliable access to the I/O adapter. An I/O adapter is a physical network interface that provides memory-mapped input/output interface for placing queues into physical memory and provides an interface for control information. Control information can be, for example, a selected interrupt to generate when a data packet arrives.

FIG. 2A is a prior art device driver 201 for I/O adapter 221. I/O adapter 221 receives service requests or process calls from several processes 211, 212, 213, and 214. Each process call provides at least one transmit packet to device driver 201 in order for the device driver to place the data of each transmit packet into the memory or registers of I/O adapter 221. I/O adapter 221, in turn, transmits the packet to a network media, including, for example, wired, and wireless media.

FIG. 2B is the flowchart for each process that makes the call to the adapter. Initially, the process determines if a lock is free (step 251). The lock is a memory location that all processes refer to when making a call to the I/O adapter. Only one process may set or acquire the lock at a time. The lock helps prevent a first process from writing or otherwise passing data to the I/O adapter at the same time a second process writes or otherwise passes data to the I/O adapter. A first arriving process may reach a positive determination at step 251. Accordingly, the first process may next perform the next process step (step 252) to acquire the lock, and then proceed to the next process step 253. In contrast, a second arriving process, for example, process 2 212, of FIG. 2A, may determine that the lock is not free, and proceed to re-determine whether the lock is free by having the processor that performs the process 2 212 instructions again perform step 251 as the next step after step 251. The term "spin lock" is commonly used in the field of computer programming to describe process steps 251 and 252. In other words, a spin lock is a sequence of machine instructions performed by a processor that includes a test to determine whether a target resource is available.

SUMMARY OF THE INVENTION

The present invention provides a computer implemented method, computer program product, and apparatus to enqueue one or more packets in a device driver for an I/O adapter. A device driver receives, by a processor executing the device driver, a reference to a list of transmit packets. The device driver may then atomically fetch and set a transmit active flag, wherein atomically setting comprises determining a former status of the transmit active flag. Responsive to a determination that a former status of the transmit active flag is different than a current status of the transmit active flag, the device driver atomically removes, by a processor executing the device driver, any packets referenced by a host machine transmit queue reference. The device driver pre-pends transmit packets referenced by the host machine transmit queue reference to the list of transmit packets to form an augmented list of transmit packets. The device driver builds a work request based on the augmented list of transmit packets. The device driver notifies the I/O adapter of the work request. The device driver atomically resets the transmit active flag.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
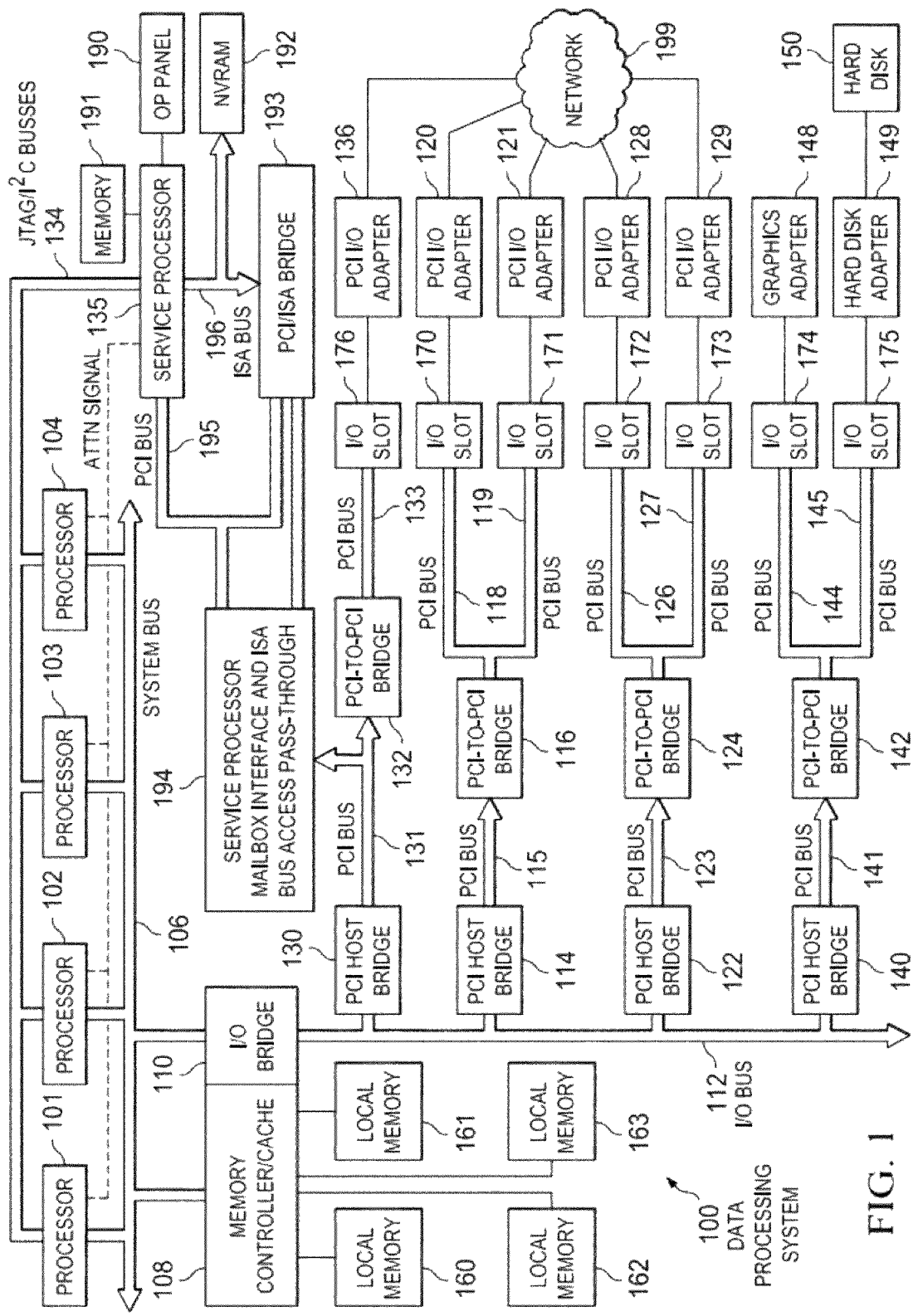
FIG. 1 is a block diagram of a data processing system in accordance with an illustrative embodiment of the invention.
Figure 2A:
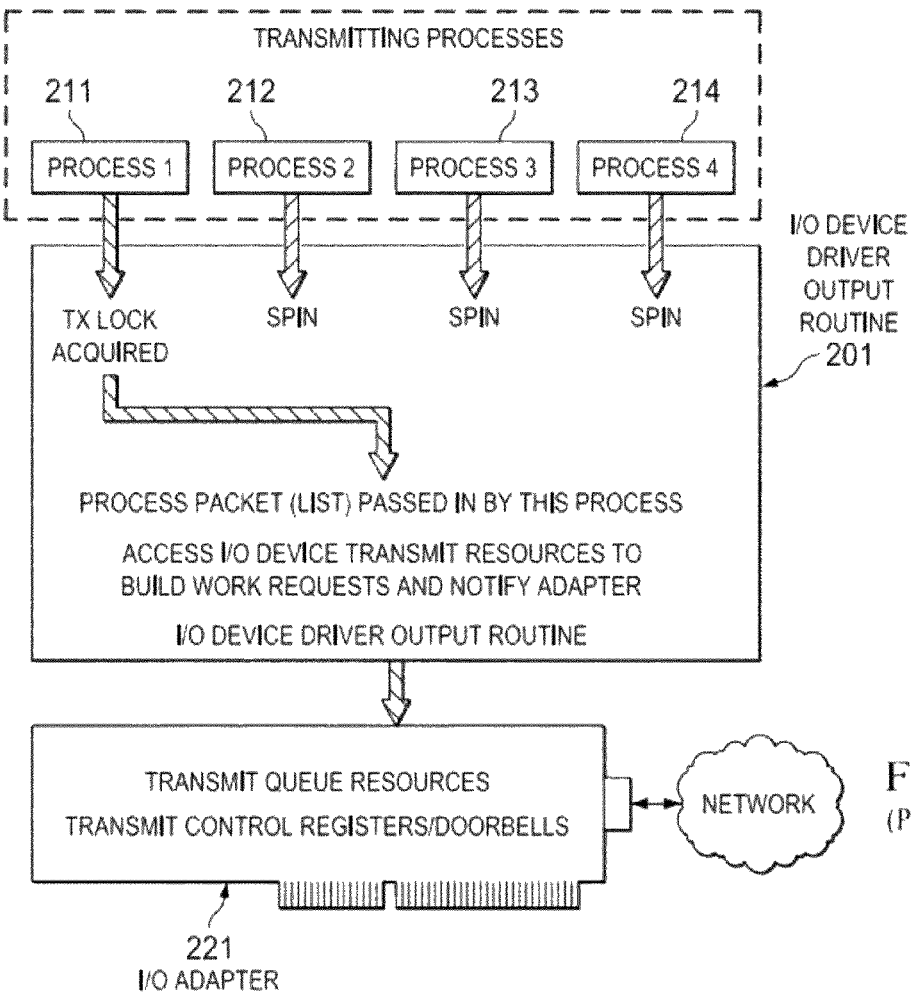
FIG. 2A is a prior art device driver for an I/O adapter in the manner of the prior art.
Figure 2B:
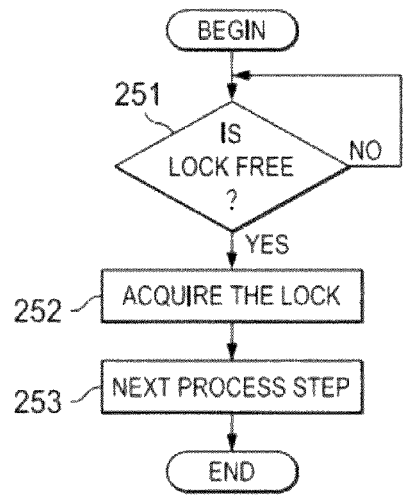
FIG. 2B is the flowchart for each process that makes the call to the adapter in the manner of the prior art.

FIG. 1 shows a block diagram of a data processing system in which illustrative embodiments of the invention may be implemented. Data processing system 100 may be a multiprocessor system, such as a symmetric multiprocessor (SMP) system including a plurality of processors 101, 102, 103, and 104, which connect to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160-163. I/O bus bridge 110 connects to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems or multiple instances of a single operating system running simultaneously. Each of these multiple operating systems may have any number of software programs executing within it. Data processing system 100 is logically partitioned such that different PCI I/O adapters 120, 121, 128, 129, and 136 may be assigned to different logical partitions.

Thus, for example, suppose data processing system 100 is divided into three logical partitions, P1, P2, and P3. Each of PCI I/O adapters 120, 121, 128, 129, 136, each of processors 101-104, and memory from local memories 160-163 is assigned to each of the three partitions. In these examples, local memories 160-163 may take the form of dual in-line memory modules (DIMMs). DIMMs are not normally assigned on a per DIMM basis to partitions. Instead, a partition will get a portion of the overall memory available on the platform. For example, processors 102-103, some portion of memory from local memories 160-163, and PCI I/O adapters 121 and 136 may be assigned to logical partition P2; and processor 104, some portion of memory from local memories 160-163 may be assigned to logical partition P3.

Each operating system executing within data processing system 100 is assigned to a different logical partition. Thus, each operating system executing within data processing system 100 may access only those I/O units that are within its logical partition. For example, one instance of the Advanced Interactive Executive (AIX®) operating system may be executing within partition P1, a second instance or image of the AIX® operating system may be executing within partition P2, and a Linux® operating system may be operating within logical partition P3. AIX® is a registered trademark of International Business Machines Corporation. Linux® is a registered trademark of Linus Torvalds.

Peripheral component interconnect (PCI) host bridge 114 connected to I/O bus 112 provides an interface to PCI local bus 115. A number of PCI input/output adapters 120-121 connect to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters, that is, expansion slots for add-in connectors. Each PCI I/O adapter 120-121 provides an interface between data processing system 100 and input/output devices such as, for example, other network computers, which can be clients to data processing system 100.

An additional PCI host bridge 122 provides an interface for an additional PCI bus 123. PCI bus 123 connects to a plurality of PCI I/O adapters 128-129. PCI I/O adapters 128-129 connect to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections through PCI I/O adapters 120, 121, 128, 129, and 136, to multiple network computers across network 199.

A memory mapped graphics adapter 148 is inserted into I/O slot 174 and connects to I/O bus 112 through PCI bus 144, PCI-to-PCI bridge 142, PCI bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI bus 141. Hard disk adapter 149 connects to and controls hard disk 150.

A PCI host bridge 130 provides an interface for a PCI bus 131 to connect to I/O bus 112. PCI I/O adapter 136 connects to I/O slot 176, which connects to PCI-to-PCI bridge 132 by PCI bus 133. PCI-to-PCI bridge 132 connects to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through 194 forwards PCI accesses destined to the PCI/ISA bridge 193. NVRAM storage 192, also known as non-volatile RAM, connects to ISA bus 196. Service processor 135 connects to service processor mailbox interface and ISA bus access pass-through 194 through its local PCI bus 195. Service processor 135 also connects to processors 101-104 via a plurality of JTAG/I$^2$C busses 134. JTAG/I$^2$C busses 134 are a combination of JTAG/scan busses, as defined by Institute for Electrical and Electronics Engineers standard 1149.1, and Philips I$^2$C busses. However, alternatively, JTAG/I$^2$C busses 134 may be replaced by only Philips I$^2$C busses or only JTAG/scan busses. All SP-ATTN signals of the processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I$^2$C busses 134 to interrogate the system processors 101-104, then memory controller/cache 108 and I/O bridge 110 via system bus 106. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating processors 101-104, memory controller/cache 108, and I/O bridge 110. Any error information for failures detected during the BISTs, BATs, and memory tests are gathered and reported by service processor 135.

If a meaningful or valid configuration of system resources is still possible after taking out the elements found to be faulty during the BISTs, BATs, and memory tests, then data processing system 100 is allowed to proceed to load executable code into local memories 160, 161, 162, and 163. Service processor 135 then releases processors 101-104 for execution of the code loaded into local memories 160-163. While processors 101-104 are executing code from respective operating systems within data processing system 100, service processor 135 enters a mode of monitoring and reporting errors. The type of items monitored by service processor 135 includes, for example, the cooling fan speed and operation, thermal sensors, power supply regulators, and recoverable and non-recoverable errors reported by processors 101-104, local memories 160-163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and determine that this condition is predictive of a hard failure. Based on this determination, service processor 135 may mark that processor or other resource for deconfiguration during the current running session and future Initial Program Loads (IPLs). IPLs are also sometimes referred to as a "boot" or "bootstrap."

Data processing system 100 may be implemented using various commercially available computer systems. For example, data processing system 100 may be implemented using IBM eServer iSeries® Model 840 system available from International Business Machines Corporation. Such a system may support logical partitioning, wherein an OS/400® operating system may exist within a partition. iSeries® and OS/400® are registered trademarks of International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example does not imply architectural limitations with respect to embodiments of the present invention.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module", or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The aspects of the illustrative embodiments provide a computer implemented method, data processing system, and computer program product for allowing a processor executing communication intensive calls to an I/O adapter to dispense with relying on spin-locks of the prior art with respect to passing data for transmittal to the I/O adapter. Accordingly, even though a processor passes data to an I/O device driver at a time that the I/O adapter is busy transmitting other data, the processor can pass a reference to data to transmit, and continue to execute instructions of, for example, an application to accomplish useful work other than spinning in a spin lock.

Figure 3:
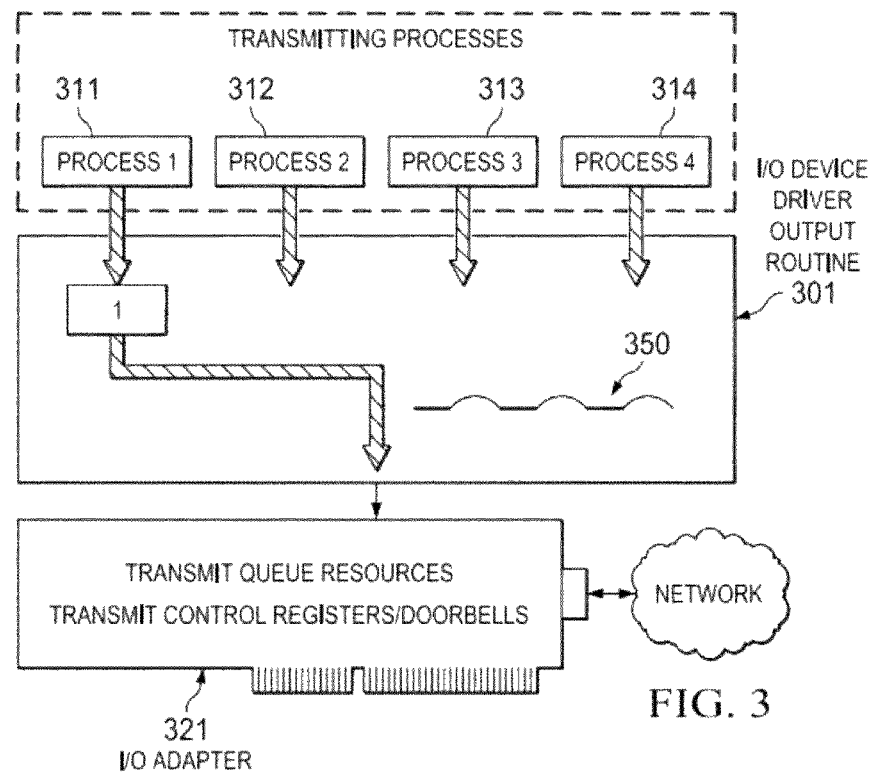
FIG. 3 is a diagram of processes accessing device driver instructions and data structures and other resources in accordance with an illustrative embodiment of the invention.

FIG. 3 is a diagram of processes accessing device driver instructions and data structures and other resources in accordance with an illustrative embodiment of the invention. Device driver resides in memory, for example, memories 160-163, of data processing system 100 of FIG. 1. A device driver is a computer program that provides instructions for execution to a data processing system that is configured to receive process calls from application processes that include communication data. A device driver can access hardware registers of the target I/O device, and may include an interrupt handler to respond to service interrupts by the device. Periodically, a processor executes instructions of device driver 301. In addition, processes 311, 312, 313, and 314 make calls to device driver 301. Process 311 passes data to device driver 301, and in response device driver sets a "transmit active flag" (TAF). A transmit active flag is a storage location for storing an electrical charge representing a bit which can be set or reset according to machine instructions executing on a processor. Consequently, the transmit active flag has a status of set. The transmit active flag is one or more bits in memory that record a status of the transmit active flag. A status of a transmit active flag or a former status of a transmit active flag is a status of electrical charge in the flag prior to an event. An event can be the execution of a machine instruction. The electrical charge can be stored as a bit setting in memory.

FIG. 3 also shows later-arrived processes 312, 313, and 314. These processes may arrive moments after process 311 has provided a reference to the device driver. The reference can be, for example, a pointer to one or more packets in a data structure (see FIG. 5 below). The reference can be a reference to a list of transmit packets. A transmit packet is a packet or a payload of a packet that has been formed and passed to a device driver. A transmit packet can be a packet prepared by an application for communication to a data processing system other than the data processing system that hosts the application.

A reference to a list of transmit packets is a memory location address used to identify at least a data structure that includes one or more packets and a further reference to null or to another packet, known as a next packet. The later arrived processes cooperate with device driver 301 to place the packets of each respective later-arrived process in transmit queue 350, such as a host machine transmit queue or a software based transmit queue.

Device driver 301 arbitrates packet references that are passed by each process in a manner that permits each process to pass a reference and continue without an intervening spin-lock phase prior to processing instructions. A reference or a packet reference is an address in memory. In a sense, the reference is a location where to find data. Nevertheless, the location can be to virtual memory and may be an indirect address that can require translation to locate the desired data. The device driver relies on at least a) transmit packet references passed directly to the device driver and b) transmit packets organized by a host machine transmit queue reference. A host machine transmit queue is a queue of one or more packets ready for handling and/or processing by I/O adapter 321. The host machine transmit queue is physically stored in memory, for example, memories 160-163 of data processing system 100 of FIG. 1. Packets referenced by a host machine transmit queue reference are packets within a linked list of ordered packets that have a first or initial packet directly or indirectly referenced, for example, by an memory location in a data processing system. As such, packets of the host machine transmit queue (HMTQ) can number one or more packets. The device driver maintains a single reference to the host machine transmit queue. This reference may be a direct reference, or an indirect reference, to a first or initial packet in the host machine transmit queue. The term "head pointer" is commonly used in the field of computer programming to describe a reference to a first or initial element in a list of elements. Later arriving processes 312, 313, and 314 add their packet (or list of packets) to the host machine transmit queue by performing a "compare and swaplp" atomic operation on the host machine transmit queue head pointer. The next packet pointer is the next packet pointer of the last packet in the packet list passed by the calling process. The "compare and swaplp" atomic operation can cause the "next packet" pointer to assume the current value of the host machine transmit queue head pointer. In addition, the "compare and swaplp" atomic operation causes the host machine transmit queue head pointer to obtain the value of the reference or indirect reference to the first packet in the packet list passed by the calling process. Process 311 removes all packets on the host machine transmit queue by performing a "fetch and clear" atomic operation on the host machine transmit queue head pointer. The result of the "fetch and clear" atomic operation is to return the current value of the host machine transmit queue head pointer to the device driver, and to then cause the host machine transmit queue head pointer to assume a NULL or 0 value. I/O adapter 321, in turn, transmits the packet to a network media, including, for example, wired, and wireless media.

Figure 4:
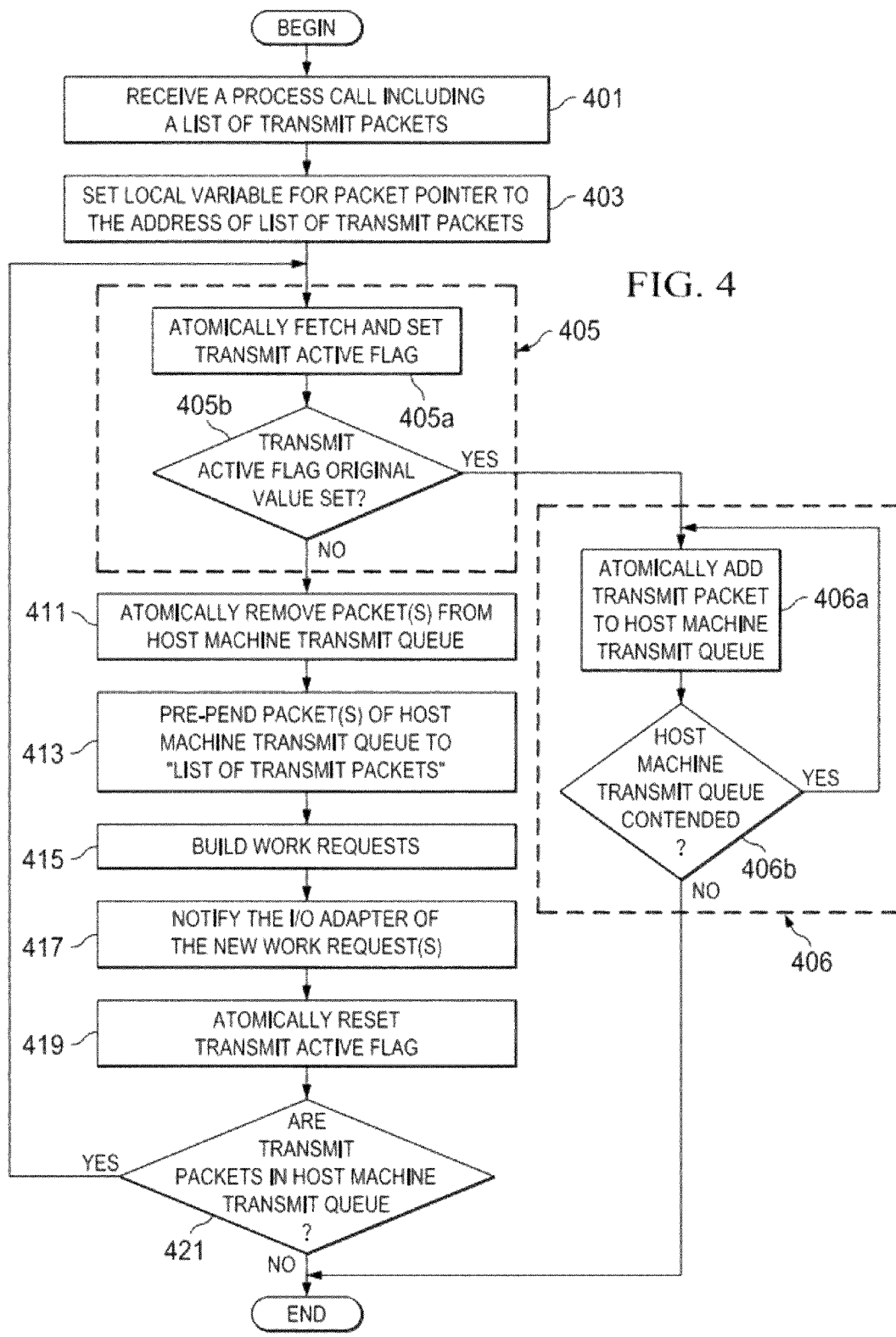
FIG. 4 is a flowchart of steps performed in a data processor or host system in accordance with an illustrative embodiment of the invention.

FIG. 4 is a flowchart of steps performed in a data processor or host system in accordance with an illustrative embodiment of the invention. Initially, a device driver receives a process call including a list of transmit packets (step 401). A list of transmit packets is one or more transmit packets referenced by a pointer, see, for example, queue 550 of FIG. 5, below. The list of transmit packets includes at least a head and a next packet pointer. Next, the device driver sets a local variable for packet pointer, for example, p_head, to the address of list of transmit packets, as defined by the head (step 403). A local variable is a variable defined within an environment of the device driver in a manner that permits the variable to be changed in response to instructions of the device driver executed on a processor.

Next, the device driver atomically fetches and sets a transmit active flag (step 405). The transmit active flag is later atomically reset by the device driver. As used herein, to execute atomically refers to executing to completion in a specified order without interruption. In other words, physical memory written to by a first process is wholly reserved to that process during the interval that a write is occurring. Accordingly, no additional process may write or otherwise alter that physical memory during the atomic operation. Further atomic operations can include writing in response to a tested condition. In other words, a memory can be tested and written to as a single atomic operation, without a second process executing an instruction to change the memory during the interval of the atomic operation.

Step 405 is a hybrid step, including a traditional data setting or transferring function as well as a data evaluation or comparison operation. Accordingly, step 405 includes two sub-steps within its operation. First, the device driver may perform an atomic operation known as fetch_and_or (step 405*a*). The fetch_and_or operation atomically fetches the original value of the transmit active flag, and performs a logical "or" operation on the transmit active flag to set its value to 1, placing the original value of the transmit active flag into the local variable, for example, transmit_active. The original value is a former status that the transmit active flag stored immediately prior to the atomically fetching and setting step 405. In this atomic operation, the 'original value' is the value that was present in the transmit active flag at the beginning of the executing of the atomic operation. The code that an illustrative embodiment may use to perform this sub-step can be, for example: transmit_active=fetch_and_or (&TRANSMIT_ACTIVE_FLAG, 1). In this instruction code, 'TRANSMIT_ACTIVE_FLAG' can be a variable name for the transmit active flag. Second, the device driver evaluates the original value of the transmit active flag returned by the fetch_and_or operation (step 405*b*). Accordingly, the device driver is said to have acquired the transmit active flag if the original value of the transmit active flag evaluates to 0. Responsive to a negative determination at step 405, the device driver removes packets from the host machine transmit queue (step 411). The device driver may perform this step with another atomic operation known as fetch_and_andlp. The fetch_and_andlp operation atomically fetches the original value of the HMTQR, and clears the host machine transmit queue reference (HMTQR), placing the original value of the reference into the local variable, for example, p_head. In other words, the atomic operation both copies the host machine transmit queue reference to p_head, and clears the host machine transmit queue reference. From the perspective of a processor executing a second process, it is as if the clearing of host machine transmit queue reference (HMTQR) and copying the HMTQR reference value to p_head occurs simultaneously, since no process may intervene between each sub-step of the atomic operation. The host machine transmit queue reference (HMTQR) may be "p_head" pointer 501 of FIG. 5, below. As such, an inconsistency between the first sub-step and the second sub-step can be avoided. The code that an illustrative embodiment may use to perform this step can be, for example, p_head=fetch_and_andlp(&SW_TX_QUEUE_HEAD, 0). In this instruction code, 'SW_TX_QUEUE_HEAD' can be a variable name for the host machine transmit queue reference (HMTQR).

Figure 5:
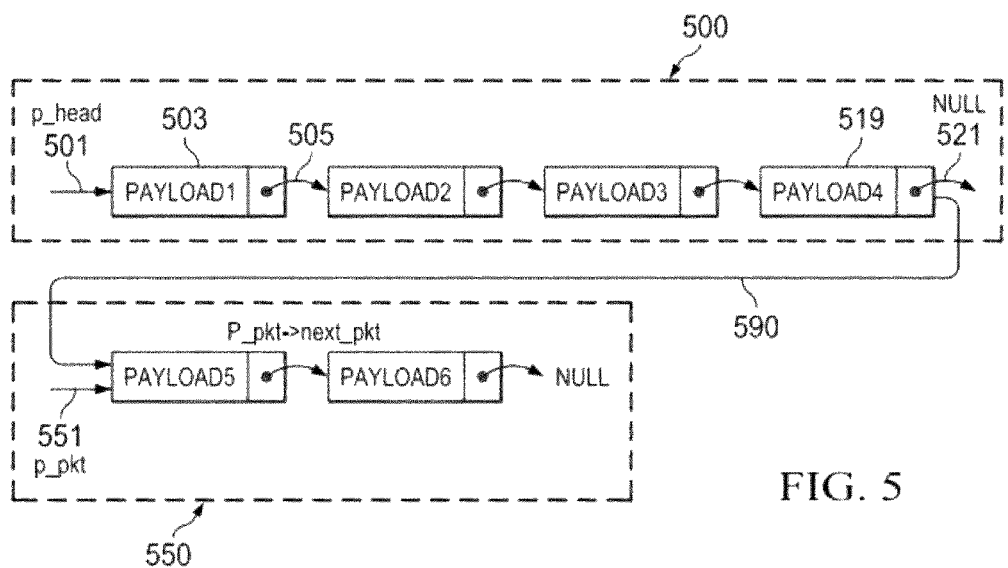
FIG. 5 is a data structure having dynamically changing references or pointers in accordance with an illustrative embodiment of the invention.

Next, the data processing system may pre-pend packets of the host machine transmit queue reference (HMTQR) to the local list of transmit packets (for example p_head) (step 413). FIG. 5 shows the progression of the local list of transmit packets or queue as step(s) 411 and 413 are executed by a processor. Host machine transmit queue reference (HMTQR) points to a data structure that is an ordered list of transmit packets or a queue. The ordered list may be a linked list may be comprised of list elements that include a packet payload, and a pointer to a next packet or to a null value. Accordingly, in this example, a list element is, for example, payload 503 and next packet pointer 505. Further list elements include a second packet, a third packet, and a fourth packet. The final list element can be the packet having payload4 519 and next packet pointer 521. Next packet pointer 521 points to null. Thus, a list element may also include a pointer to null.

At the outset of device driver flowchart 400, data was passed to the device driver. The data may be, for example, a packet referenced by p_pkt 551. Step 413 sets next packet pointer 521 to be p_pkt, thus pre-pending the host machine transmit queue to the queue reference by p_pkt 551. Accordingly, packet pointer's 521 value is redirected to point to p_pkt. The resultant pointer reference stored to packet pointer 521 is shown as revised pointer 590. Revised pointer 590 is merely a number reference, yet retains the identity of the pointer to the next packet in relation to packet (payload4) 519. Accordingly, the lists of packets, host machine transmit queue 500 and queue 550 (p_pkt in this example) are unified as a single list of transmit packets accessible in sequence from host machine transmit queue reference 501. An augmented list of transmit packets is a list of transmit packets that has grown in response to a) de-referencing a host machine transmit queue reference final next packet reference, and re-referencing the next packet reference 521 to point to a second packet that directly or indirectly references the first packet. Thus, step 413 forms the augmented list of transmit packets.

Returning to FIG. 4, the device driver next builds one or more work requests based on the augmented list of transmit packets (step 415). A work request describes the work to be performed by an I/O adapter. The structure and specific content of a work request is dependent upon the unique requirements of the I/O adapter for which it is being created. Typically, a transmit work request will, at a minimum, describe the address and length of the transmit packet or list of transmit packets. A transmit work request may include additional information regarding the transmit packet or list of packets, to facilitate the I/O adapter's processing of the transmit packet or list of packets. The work request is a reference to an augmented list of transmit packets as defined by host machine transmit queue reference (HMTQR). A work request is data placed in a manner that allows an I/O adapter to access the data. The device driver notifies the I/O adapter of the new work request(s) (step 417). Next, the device driver may atomically reset the transmit active flag (step 419). The code that an illustrative embodiment may use to perform this step can be, for example, fetch_and_and(&TRANSMIT_ACTIVE_FLAG, 0). In this instruction code, 'TRANSMIT_ACTIVE_FLAG' can be a variable name for the transmit active flag. The compare_and_swaplp operation, fetch_and_andlp operation, fetch_and_operation and fetch_and_or operation may be kernel services. Kernel services are routines that provide the runtime kernel environment to programs executing in kernel mode. Kernel extensions call kernel services, which resemble library routines. The kernel manages an application or user program access to system hardware.

Next, the device driver may determine whether transmit packets are in the host machine transmit queue (step 421). Responsive to a positive determination, the device driver may repeat step 405. However, a negative result at step 421 may result in processing terminating thereafter.

A positive determination to step 405 can cause the device driver to atomically add the transmit packet to the host machine transmit queue (step 406). Step 406 consists of two sub-steps. First, the device driver may perform an atomic operation known as compare_and_swaplp (sub-step 406*a*). The compare_and_swaplp operation is commonly used in the field of computer programming to atomically add a single element or list of elements to a linked list. The compare_and_swaplp operation compares the value of the host machine transmit queue reference (HMTQR) with the next_pkt pointer of the final packet in the transmit packet list. If the values are determined to be equal, the p_pkt pointer of the first packet in the transmit packet list is stored in the HMTQR and the compare_and_swaplp function returns 0. If the values are determined to be not equal, the value of the HMTQR is stored in the next_pkt pointer of the final packet in the transmit packet list and the compare_and_swaplp function returns 1. The code that an illustrative embodiment may use to perform step 406 can be, for example, success=compare_and_swaplp (&SW_TX_QUEUE_HEAD, &p_pkt->next_pkt, p_pkt). In this instruction code, 'success' can be a variable name for the returned value from the compare_and_swaplp operation, 'SW_TX_QUEUE_HEAD' can be a variable name for the host machine transmit queue reference (HMTQR), and 'p_pkt' can be a variable name for a reference or indirect reference to a transmit packet or list of transmit packets. Second, the device driver may evaluate the returned value of the compare_and_swaplp operation (sub-step 406*b*).

A positive determination at sub-step 406b may indicate that the device driver was unable to atomically add the transmit packet or list of transmit packets to the HMTQR due to contention for the HMTQR, and may cause the device driver to re-execute step 406. However, a negative result can indicate the device driver was able to atomically add the transmit packet or list of transmit packets (from step 403) to the HMTQR. Processing terminates thereafter.

The illustrative embodiments permit a processor, executing communication intensive calls to an I/O adapter, to more directly pass data for transmittal to the I/O adapter without spin-locking. Accordingly, even though a processor passes data to an I/O device driver at a time that the I/O adapter is busy transmitting data, the processor can pass a reference to packets to transmit, and continue to execute instructions, of, for example, an application, to accomplish useful work other than spinning in a spin lock.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of enqueuing one or more packets in a device driver for an I/O adapter, the computer implemented method comprising:
  receiving, by a processor executing the device driver, a reference to a first list of transmit packets;
  atomically fetching and setting a transmit active flag, wherein atomically fetching and setting comprises determining a former status of the transmit active flag, wherein atomically fetching and setting the transmit active flag comprises executing a fetch and a set to the transmit active flag without a second process executing an instruction to change the transmit active flag during an interval of the atomically fetching and setting;
  responsive to a determination that a former status of the transmit active flag is different than a current status of the transmit active flag, atomically removing, by a processor executing the device driver, any packets referenced by a host machine transmit queue reference;
  pre-pending transmit packets referenced by the host machine transmit queue reference to the list of transmit packets to form an augmented list of transmit packets;
  building a work request based on the augmented list of transmit packets;
  notifying the I/O adapter of the work request; and
  atomically resetting the transmit active flag.

2. The computer implemented method of claim 1, further comprising:
  receiving a second reference to a second list of transmit packets;
  atomically setting the transmit active flag;
  determining that a second former status of the transmit active flag is the same as a second current status of the transmit active flag;
  responsive to the determination that the second former status of the transmit active flag is the same as the current status of the transmit active flag, determining whether the transmit packets referenced by the host machine transmit queue reference is contended; and
  responsive to the transmit packets referenced by the host machine transmit queue reference being uncontended, atomically adding the second list of transmit packets to the transmit packets referenced by the host machine transmit queue reference.

3. The computer implemented method of claim 1, pre-pending a second list of transmit packets in response to a later received process call subsequent to atomically setting the transmit active flag.

4. The computer implemented method of claim 1, wherein the transmit active flag is an atomically settable transmit active flag.

5. The computer implemented method of claim 1, wherein a second list of transmit packets is received from a process that avoids entering a spin lock contemporaneously with providing a second reference.

6. The computer implemented method of claim 1, wherein atomically setting the transmit active flag is a fetch_and_or kernel service executed on the processor.

7. The computer implemented method of claim 1, wherein atomically resetting the transmit active flag is a fetch_and_and kernel service executed on the processor.

8. The computer implemented method of claim 1, wherein atomically removing any packets referenced by a host machine transmit queue reference comprises a compare_and_andlp kernel service executed on the processor.

9. The computer implemented method of claim 1, wherein atomically adding the second list of transmit packets to the transmit packets referenced by the host machine transmit queue reference comprises a compare_and_swaplp kernel service executed on the processor.

10. A computer program product for enqueuing one or more packets in a device driver for an I/O adapter, the computer program product comprising: a computer usable tangible storage device having computer usable program code embodied therewith, the computer program product comprising:
   computer usable program code configured to receive, by a processor executing the device driver, a reference to a first list of transmit packets;
   computer usable program code configured to atomically fetch and set a transmit active flag, wherein atomically fetching and setting comprises determining a former status of the transmit active flag, wherein atomically fetching and setting the transmit active flag comprises computer usable program code configured to execute a fetch and a set to the transmit active flag without a second process executing an instruction to change the transmit active flag during an interval of atomically fetching and setting;
   computer usable program code configured to atomically remove, by a processor executing the device driver, any packets referenced by a host machine transmit queue reference, responsive to a determination that a former status of the transmit active flag is different than a current status of the transmit active flag;
   computer usable program code pre-pending transmit packets referenced by the host machine transmit queue reference to the list of transmit packets to form an augmented list of transmit packets;
   computer usable program code configured to build a work request based on the augmented list of transmit packets;
   computer usable program code configured to notify the I/O adapter of the work request; and
   computer usable program code configured to atomically reset the transmit active flag.

11. The computer program product of claim 10, further comprising:
   computer usable program code configured to receive a second reference to a second list of transmit packets;
   computer usable program code configured to atomically set the transmit active flag;
   computer usable program code configured to determine that a second former status of the transmit active flag is the same as a second current status of the transmit active flag;
   computer usable program code configured to determine whether the transmit packets referenced by the host machine transmit queue reference is contended, responsive to the determination that the second former status of the transmit active flag is the same as the current status of the transmit active flag; and
   computer usable program code configured to add the second list of transmit packets to the transmit packets referenced by the host machine transmit queue reference, responsive to the transmit packets referenced by the host machine transmit queue reference being uncontended.

12. The computer program product of claim 10, further comprising computer usable program code configured to pre-pend a second list of transmit packets in response to a later received process call subsequent to atomically setting the transmit active flag.

13. The computer program product of claim 10, wherein the transmit active flag is an atomically settable transmit active flag.

14. The computer program product of claim 10, wherein a second list of transmit packets is received from a process that avoids entering a spin lock contemporaneously with providing a second reference.

15. The computer program product of claim 10, wherein computer usable program code configured to atomically set the transmit active flag is a fetch_and_or kernel service executed on the processor.

16. The computer program product of claim 10, wherein computer usable program code configured to atomically reset the transmit active flag is a fetch_and_and kernel service executed on the processor.

17. The computer program product of claim 10, wherein computer usable program code configured to atomically remove any packets referenced by a host machine transmit queue reference comprises a compare_and_andlp kernel service executed on the processor.

18. The computer program product of claim 10, wherein computer usable program code configured to atomically add the second list of transmit packets to the transmit packets referenced by the host machine transmit queue reference comprises a compare and swaplp kernel service executed on the processor.

19. A data processing system comprising:
   a bus;
   a storage device connected to the bus, wherein computer usable code is located in the storage device;
   a communication unit connected to the bus; and
   a processing unit connected to the bus, wherein the processing unit executes the computer usable code for enqueuing one or more packets in a device driver for an I/O adapter, the processing unit further executes the computer usable code to receive, a reference to a first list of transmit packets;
   atomically fetch and set a transmit active flag, wherein atomically fetching and setting comprises determining a former status of the transmit active flag, wherein the processing unit executes computer usable code to atomically fetch and set the transmit active flag by executing a fetch and a set to the transmit active flag without a second process executing an instruction to change the transmit active flag during an interval of the processing unit atomically fetching and setting;

atomically remove any packets referenced by a host machine transmit queue reference, responsive to a determination that a former status of the transmit active flag is different than a current status of the transmit active flag;

pre-pending transmit packets referenced by the host machine transmit queue reference to the list of transmit packets to form an augmented list of transmit packets;

build a work request based on the augmented list of transmit packets; notify the I/O adapter of the work request; and atomically reset the transmit active flag.

20. The data processing system of claim 19, wherein the processing unit further executes computer usable code to receive a second reference to a second list of transmit packets; atomically fetch and set the transmit active flag; determine that a second former status of the transmit active flag is the same as a second current status of the transmit active flag; determine whether the transmit packets referenced by the host machine transmit queue reference is contended, responsive to the determination that the second former status of the transmit active flag is the same as the current status of the transmit active flag; and atomically add the second list of transmit packets to the transmit packets referenced by the host machine transmit queue reference, responsive to the transmit packets referenced by the host machine transmit queue reference being uncontended.

21. The data processing system of claim 19, further the processing unit further executes computer usable program code configured to pre-pend a second list of transmit packets in response to a later received process call subsequent to atomically setting the transmit active flag.

22. The data processing system of claim 19, wherein the transmit active flag is an atomically settable transmit active flag.

23. The data processing system of claim 19, wherein a second list of transmit packets is received from a process that avoids entering a spin lock contemporaneously with providing a second reference.

24. The data processing system of claim 19, wherein computer usable program code configured to atomically set the transmit active flag is a fetch_and_or kernel service executed on the processor.

25. The data processing system of claim 19, wherein computer usable program code configured to atomically reset the transmit active flag is a fetch_and_and kernel service executed on the processor.

\* \* \* \* \*